Dec. 13, 1932.   M. L. HASELTON ET AL   1,890,878
ELECTRICAL INDICATING SYSTEM
Original Filed Feb. 23, 1928   7 Sheets-Sheet 1
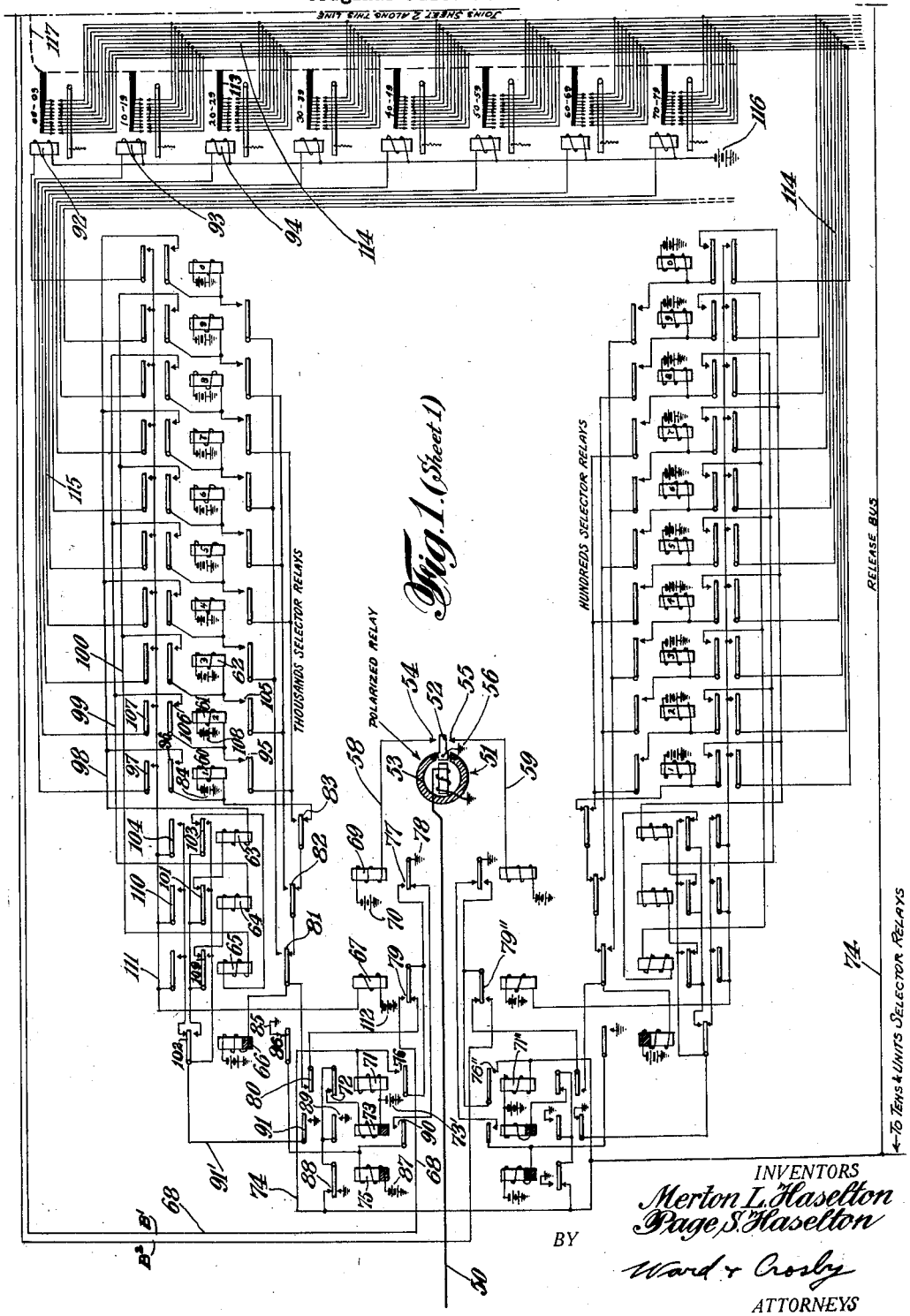
INVENTORS
Merton L. Haselton
Page S. Haselton
BY
Ward & Crosby
ATTORNEYS

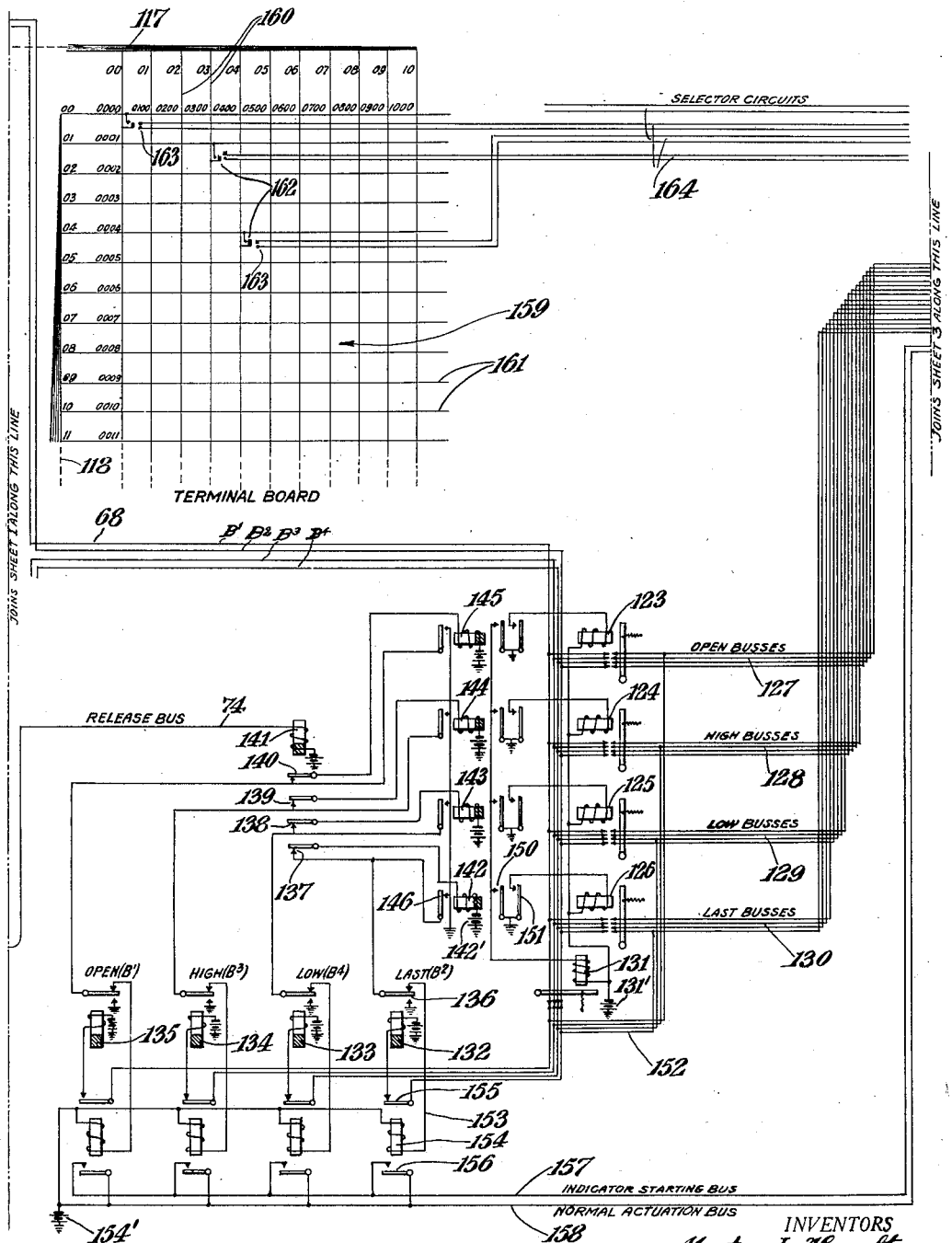
Fig.1 (Sheet 2)

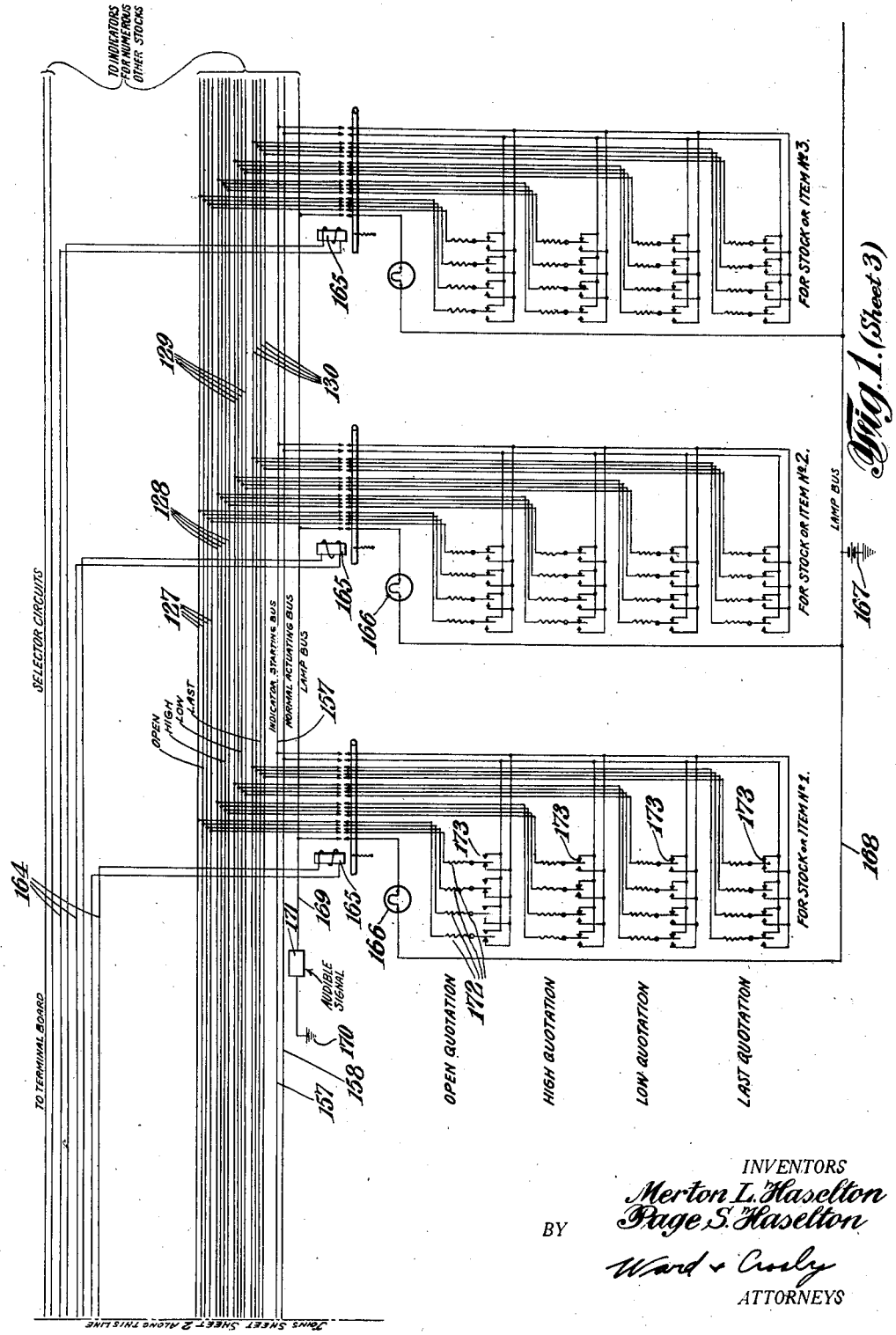

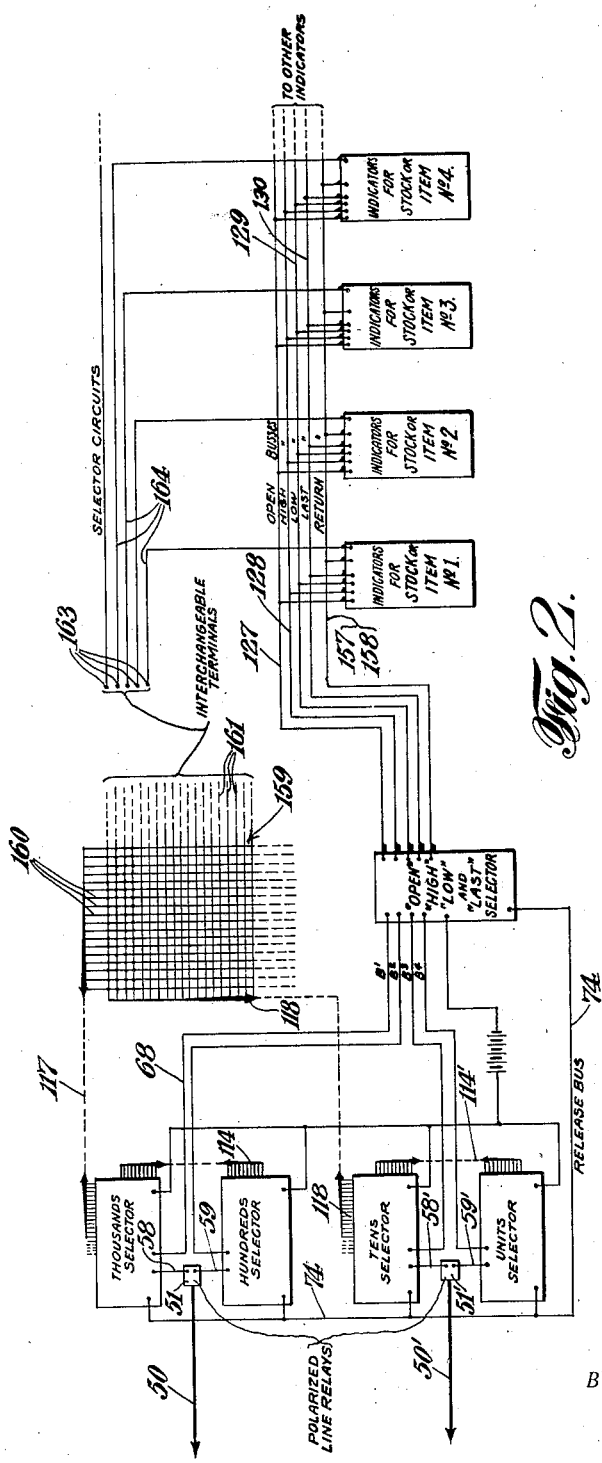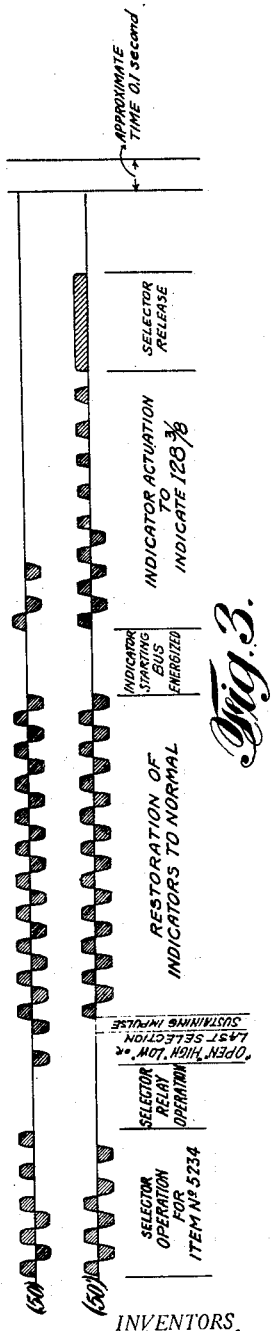

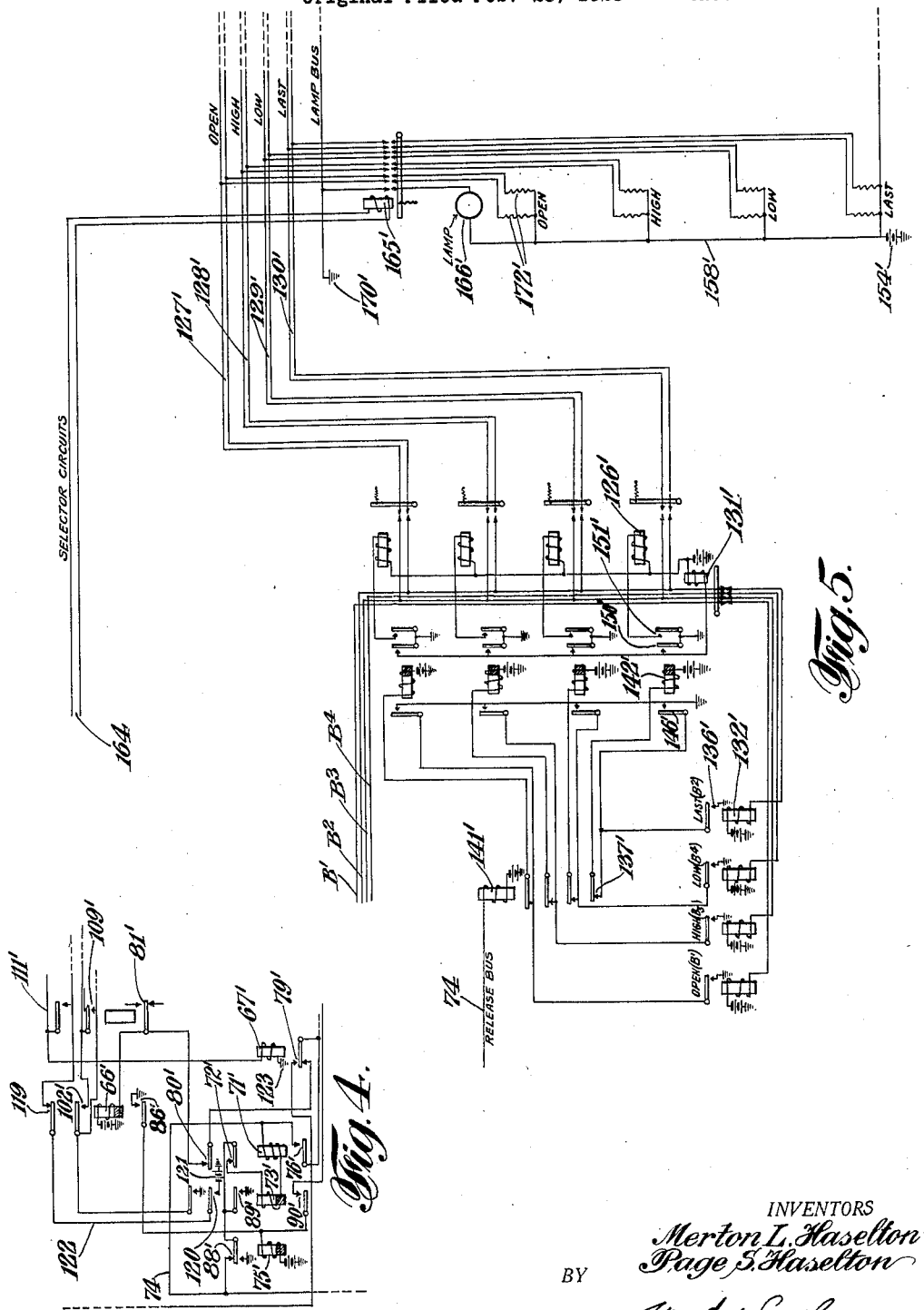

Dec. 13, 1932.   M. L. HASELTON ET AL   1,890,878
ELECTRICAL INDICATING SYSTEM
Original Filed Feb. 23, 1928   7 Sheets-Sheet 6
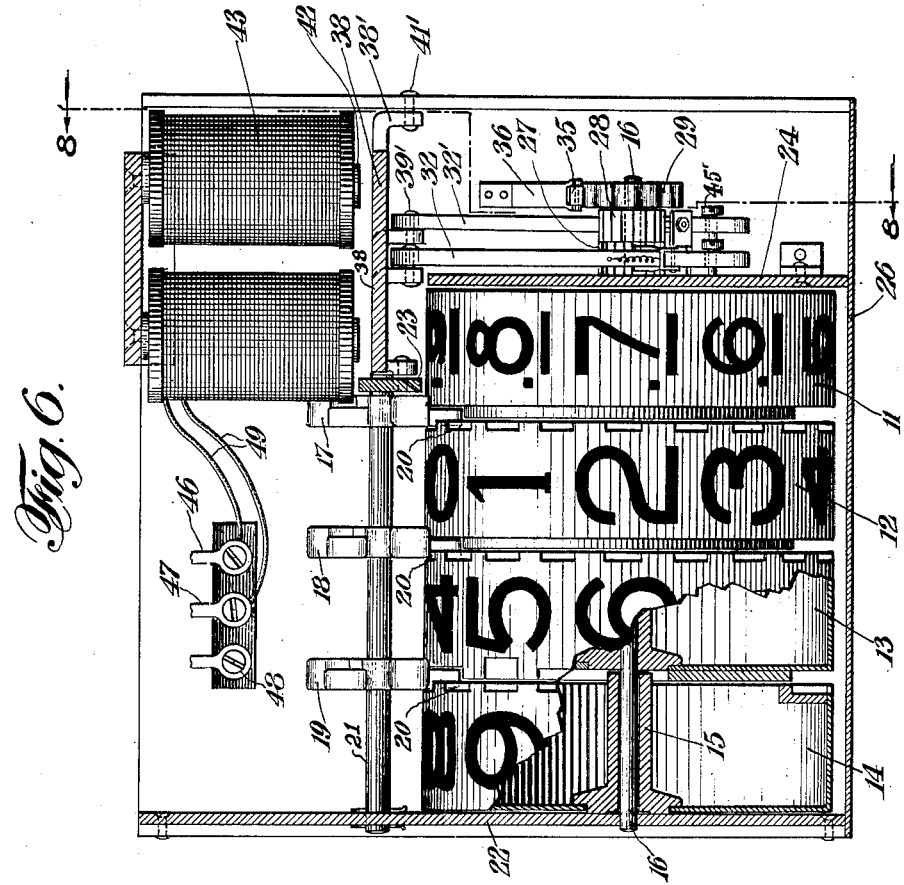
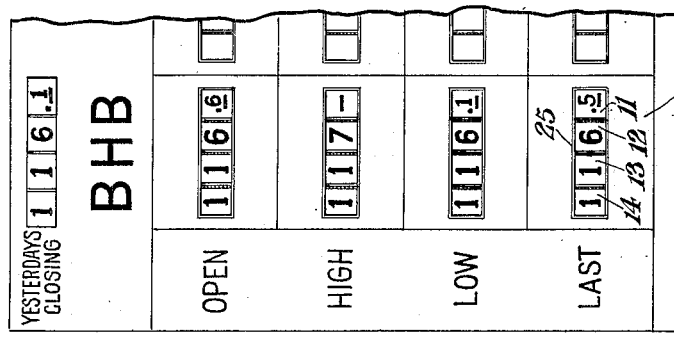
INVENTORS
Merton L. Haselton
Page S. Haselton
BY
Ward & Crosby Dec. 13, 1932.  M. L. HASELTON ET AL  1,890,878
ELECTRICAL INDICATING SYSTEM
Original Filed Feb. 23, 1923   7 Sheets-Sheet 7
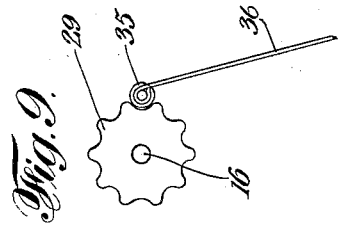
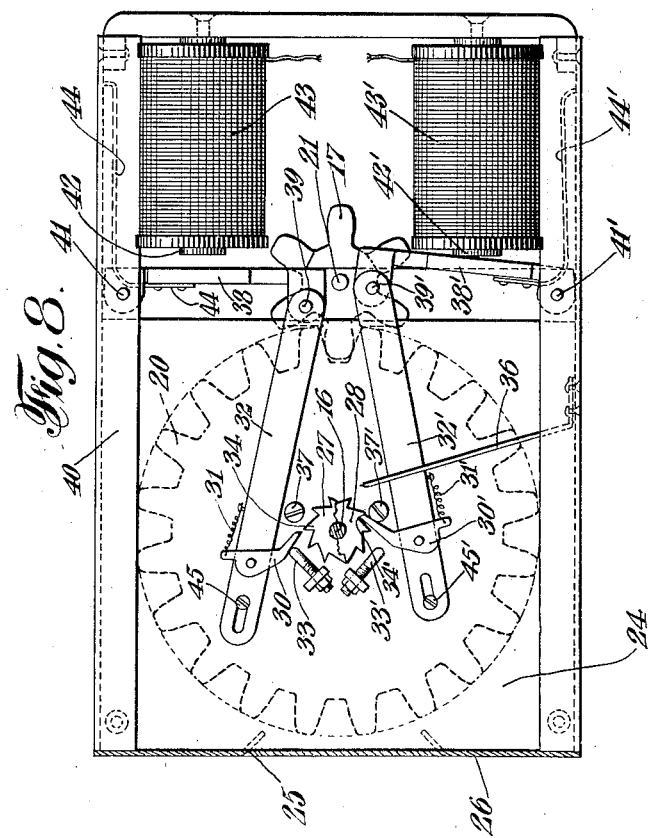
INVENTORS
Merton L. Haselton
Page S. Haselton
BY Word & Crosby.
ATTORNEYS.

Patented Dec. 13, 1932

1,890,878

UNITED STATES PATENT OFFICE

MERTON L. HASELTON, OF RYE, NEW YORK, AND PAGE S. HASELTON, OF MONTCLAIR, NEW JERSEY, ASSIGNORS, BY MESNE ASSIGNMENTS, TO THE TELEREGISTER CORPORATION, OF NEW YORK, N. Y., A CORPORATION OF DELAWARE

ELECTRICAL INDICATING SYSTEM

Application filed February 23, 1928, Serial No. 256,160. Renewed May 7, 1932.

This invention relates to electrical signaling and indicating means, and more particularly to signaling apparatus and methods according to which information concerning a large number of different items may be made available at a plurality of receiving stations, all controlled over a relatively small number of line wires from a central point or points.

While not limited thereto, the invention is particularly adaptable to the transmission and posting of varying quotations or prices of a multitude of items such as stocks, bonds or commodities.

The transmission of the quotations may be controlled from central points, such as stock exchanges, and arrangements are provided whereby a large number of brokers may be simultaneously provided with quotation service for as many of the stocks or other items as are desired or of particular interest at each broker's office or other establishment having suitable receiving apparatus.

The objects of our invention include the provision of apparatus of the above indicated class which will be applicable with a wide degree of flexibility to various operating conditions and which will be rapid, accurate and dependable in operation.

Further and more specific objects, features and advantages will more clearly appear from the following description taken in connection with the accompanying drawings and claims.

The invention consists in the novel signaling methods, features, circuit arrangements and combinations of circuits and parts as hereinafter described, but by way of example only, as being illustrative of certain preferred embodiments of the invention.

In the drawings, Fig. 1 comprises a schematic diagram showing in part the circuit arrangements of one embodiment of the invention. It will be noted that this figure extends over three sheets.

Fig. 2 is a diagrammatic illustration of a complete receiving equipment as embodying the invention.

Fig. 3 is a diagram showing groups of current variations, such as may be transmitted over a pair of line wires for the control of the receiving system of Fig. 2.

Fig. 4 is a detail view of certain circuit connections for the system of Fig. 2.

Fig. 5 comprises a wiring diagram of an alternative form of indicator arrangement applicable to parts of the system of Fig. 1.

Fig. 6 is a horizontal sectional view through an indicating device such as may be used with the circuit arrangement of Fig. 5.

Fig. 7 is a front view of a small portion of a broker's board, made up of indicators as of Fig. 6.

Fig. 8 comprises a transverse sectional view through the indicator on the line 8—8' of Fig. 6; and Fig. 9 comprises a detail view of a portion of the device of Fig. 6 taken substantially along the section line 8—8 looking toward the right.

The apparatus of this invention may be operated for example in conjunction with quotation boards or the like apparatus, such as shown in the pending application of Robert L. Daine and Rene Guye, Ser. No. 246,474, filed January 13, 1928. Also if desired, the flexibility of the service rendered by the apparatus of this invention may be greatly enhanced by utilizing the invention covered by the patent to Robert L. Daine, No. 1,658,516, issued February 7, 1928, entitled "Methods and apparatus for indicating quotations or other items". Also, certain elemental circuits, arrangements and devices embodied in the apparatus hereinafter described may be constructed as disclosed in the patent to Francois Favarger, 1,787,620 issued Jan. 6, 1931 and in the patent to Frischknecht et al., 1,852,994 issued April 5, 1932.

Certain phases of this invention are applicable to the apparatus and signaling methods disclosed in the copending applications of Merton L. Haselton, Ser. No. 244,873, filed January 6, 1928, and Ser. No. 248,069, filed January 20, 1928, and also certain phases of the inventions of said Haselton applications are applicable to the signaling apparatus disclosed herein.

Where the information to be posted comprises stock quotations or similar items, it is desirable to make the information available, generally speaking, in the same arrangement as with the conventional types of manually attended stock boards or "blackboards" as heretofore used. The apparatus in the particular form hereinafter described is particularly adapted to that purpose, although according to this invention the posting of quotations may be accomplished with much greater rapidity and accuracy than with stock boards which are manually attended, and in addition a substantial saving of labor is made possible since the equipment for numerous brokers may be operated from a central point by a single operator or group of operators.

Each stock, bond or commodity quotation generally comprises four or a smaller number of digits, such as the hundreds, tens, units and fraction values, and for each item the broker's customers are generally desirous of knowing the "open", "high", "low" and "last" quotations. Accordingly for each item a total of 16 indicator units or number dials may be provided, the same being arranged in four groups, that is, the "open", "high", "low" and "last" groups, each group having four units.

*Selector circuits*

The circuits which operate to select indicator groups for the desired stocks or other items will now be described. Referring to Fig. 1, Sheet 1, or to Fig. 2, control impulses may be transmitted from a suitable transmitter at the central operating station over two line wires as at 50 and 50'. The line 50 may be connected to the magnet winding of a polarized relay 51. Relay 51 may be provided with an armature as at 52 having three positions. The armature is designed to normally rest at a middle or neutral position when the line 50 is not energized, and when the line 50 is energized, the armature is arranged to cooperate with a permanent magnet 53 so as to move into contact-making position with either of a pair of contacts 54 and 55, depending upon the polarity of the line current. That is, when the line 50 is energized with a positive potential, the armature may be arranged to move into circuit-making position in respect to contact 54, for example, whereby such contact is grounded through a ground connection 56 connected to the armature, and when the line 50 is energized with a negative potential, the armature 52 moves into circuit-making position in respect to contact 55. The circuit of the line wire 50 after passing through the magnet winding of the polarized relay, may run to a ground return as indicated.

It will be understood that the polarized relay is here indicated somewhat schematically for simplicity, inasmuch as various types of such relays are well known in the art. In fact, in actual practice, two oppositely polarized relays might of course be used, in a well known manner, to avoid using a three-position relay. The moving parts of the polarized relays here used are preferably made as light in weight as possible, so that the relays will be quickly responsive to impulses having a duration of 0.1 seconds and less.

Through the contact 54 and a connection wire 58, positive impulses arriving over the line 50 will be relayed to the "thousands selector" relay group, as indicated at the upper part of Fig. 1, Sheet 1, and likewise, negative impulses will be relayed through the contact 55 and a lead wire 59 to the "hundreds selector" relay group, as shown at the lower part of Fig. 1, Sheet 1.

It will be understood that the positive and negative impulses may be transmitted over the line alternately in rapid succession. That is, both a positive and a negative impulse may be transmitted, for example, within 0.1 seconds. Such impulses preferably may be of an equal duration of, say approximately 0.05 seconds, as indicated in the diagram of Fig. 3, which will be hereinafter fully described. One of the advantages in transmitting positive and negative impulses alternately is that more time is allowed for switching the impulsing circuit from one counting magnet to the next counting magnet, the switching operation being performed after the termination of the impulse energizing the counting magnet which prepares the circuit for the corresponding switching magnet as fully set forth hereinafter. Also, if desired, only impulses of one polarity and of 0.05 seconds duration, for example, may be transmitted. In either event, the polarized relay or relays serve to separate the negative from the positive impulses, and allocate them to their intended selector circuits.

The function of numerous relays in the "thousands selector" group will now be briefly explained before tracing the circuits thereof. The operation of the corresponding relays of groups designated as "hundreds", "tens", and "units" selector relays is similar. The "thousands" and "hundreds" selector relays may act conjointly and preferably substantially simultaneously under the control of line wire 50 to choose one of the vertical wires of the terminal board schematically indicated in Fig. 1, Sheet 2, and to apply a ground connection to such chosen wire. Similarly, the "tens" and "units" selector relays may operate conjointly and preferably substantially simultaneously under the control of line wire 50' (see Fig. 2) to connect a chosen one of the horizontal terminal board wires or busses to a source of current such as a battery and thence to ground.

Referring again to Fig. 1, Sheet 1, a "counting chain" of relays is indicated at 60, 61, 62, etc., such relays being here numbered (with miniature numerals 1–9 and 0). These relays respectively correspond to the thousands digit numbers of a stock or item designating number. It will be understood, however, that if the stocks or items are to be arbitrarily designated by letters or other characters in lieu of using the numerical system, a number of the relays as at 60—62, etc., would be provided equal to the number of designating characters used. For example, if alphabetical designations were used, 26 of these relays would be provided corresponding respectively to the 26 letters of the alphabet and an additional relay corresponding to "blank" or zero might also be provided for a purpose hereinafter explained, but for simplicity the numerical system is here illustrated embodying 10 of these relays in each selector group. The first of these relays closes upon reception of the first impulse, the second relay closes upon reception of the second impulse, and so on up to as many as ten impulses.

A group of relays 63, 64 and 65 perform certain auxiliary switching functions in connection with the "counting chain" relays and insure the operation of the "counting chain" relays in proper sequence. A relay 66 which is of the "slow to release" type as conventionally indicated, "picks up" at the first impulse and opens approximately 0.1 seconds after the last impulse of the first series of impulses. This opening of relay 66, after the first series of impulses, causes certain final switching operations to be performed, including grounding of the chosen terminal board wire as above referred to, and the energization of a relay 67 which transfers the "counting chain" impulsing circuit from the "counting chain" to an indicator operating bus 68, and whereby the succeeding series of impulses transmitted over the line 50 has no further effect upon the selector circuits.

An impulsing relay at 69 is provided to relieve the relatively light contact 54 of the polarized relay from any necessity of carrying comparatively large currents which may be necessary to operate the selector or indicator circuits. It will be observed that the circuit from contact 54 is continued through a lead wire 58, winding of relay 69, to battery 70, and thence to a ground return.

It may be here explained that after the operations of selecting the indicators for a particular stock or item and the desired actuation of such indicators have been completed, the selector relays may be restored to normal condition ready for a subsequent operation by applying to the line 50' a sustained potential or an impulse of a duration substantially longer than the impulses above referred to. A relay 71 is provided to insure that such sustained impulses will not be transmitted to the selector relays, and in addition relay 71, when energized, breaks a circuit through its contact 72, thus releasing another relay 73, which in turn causes all of the selector relays (except 71) to be restored to normal or open positions. The release relay 71 is connected in multiple over a release bus wire 74 with similar release relays or magnets as at 71″ on the other selector groups (see "hundreds" selector group, and also Fig. 2). That is, grounding of the release bus 74 acts to energize all of the relays as at 71, 71″, etc., so as to cause restoration of the entire receiving system to normal. Still another relay 75 of the "slow to release" type as conventionally indicated, is provided for the purpose of applying the ground connection above referred to, to the release bus 74, whenever a prolonged potential or impulse is applied to the line 50.

The operating circuits of the above described relays will now be explained in detail.

We shall assume that the relays are initially all de-energized. The first impulse of positive potential over the line 50 operates the polarized relay 51 to close the circuit of relay 69 through contact 54 as above explained, causing relay 69 to "pick up".

Relay 69 thereupon closes its "make" contact at 77, which in turn closes an impulsing circuit to relays 60 and 66, as follows: ground at 78, contact 77, "break" contact at 79 of relay 67, "break" contact at 80 of relay 71 to relay 66, thence to battery and ground, and also through a branch circuit from a "break" contact at 81 of relay 65, "break" contact at 82 of relay 64, "break" contact at 83 of relay 63, through the winding of relay 60, and thence to battery and ground at 84.

Relay 66 in "picking up" connects a ground at 85 through a "make" contact at 86 to the winding of relay 75, the circuit thereof being completed through battery and ground at 87. Thereupon relay 75 "picks up" and by "breaking" its contact at 88, isolates the release bus 74 in so far as the "thousands" selector relay group is concerned, but holds its contact at 88 in readiness to ground the release bus at the proper time. This operation of the contact 88 causes a ground to be applied through a "make" contact at 88 to a circuit of relay 73, causing relay 73 to "pick up". This circuit includes the ground at "make" contact 88, "break" contact 72 of relay 71, the winding of relay 73, and thence to battery and a ground return at 73'. Relay 73 in "picking up" in turn closes a "make" contact at 89, a "make" contact 91, and a "make" contact at 90. Contact 89 it will be observed, provides an additional ground connection comprised in a "stick circuit" for the relay 73. The closing of contact 90, it will be observed, closes a branch circuit from the "break" contact at 77 of relay 69, through the relay 75. The closing of contact 91 places a ground on a connection wire 91' for preparing a holding circuit for relays 63, 64, 65 and 67, and later for certain multi-contact selector relays as at 92, 93, 94, etc.

The relay 60, upon being closed by the first impulse, prepares three circuits by reason of closing its contacts at 95, 96 and 97. Through contact 95 the impulsing circuit to the second "counting relay" 61 is partially completed. Through contact 96 a holding circuit is prepared for relay 60 over a circuit from ground and battery at 84, winding of relay 60, "make" contact at 96, a lead wire 98, the winding of relay 63, a "break" contact at 101 of relay 64, a "make" contact at 102 of relay 66, thence through lead wire 91' and "make" contact 91 to ground. The relay 63 remains un-energized as it is short-circuited by direct ground applied to relay 60 at contact 77. It may be here noted that when other "counting relays" as 61, 62, etc., are actuated by subsequent impulses, similar circuits are completed through connection wires as at 99 and 100 to the relays 64 and 65 respectively. These circuits become completed and effective upon opening of the contact at 77 after the completion of the respective impulses over the line, as will be hereinafter further explained.

Contact 97 of the relay 60 partially completes a circuit to the multi-contact relay 93, which however is not effective until the release of relay 66 after the selecting series of impulses is completed.

Upon the opening of contact 77 of the impulsing relay 69, relay 63 "picks up" over the circuit previously described in series with relay 60. Relay 63 in "picking up" closes its "make" contact at 83, which completes the impulsing circuit to relay 61 (that is, "counting relay" #2), such circuit being completed through "make" contact at 95 of relay 60, the circuit running through the coil of relay 61 to battery and ground at 108. Concurrently the operation of the contact 83 opens the impulsing circuit through the coil of relay 60 ("counting relay" #1), for the reason that the "break" contact at 83 is opened. This energization of relay 63 also causes its "break" contact at 103 to be opened and the "make" contact to be closed, although this results in no effective circuit change for the time being. Energization of relay 63 also closes a circuit through a "make" contact at 104, which prepares but does not complete a holding circuit for the multi-contact relay 93, such circuit being for the time being open at the "break" contact at 102.

Let us assume that a total of two "thousands" selecting impulses are to be transmitted to choose a stock or other item designated by a number, the "thousands" digit of which is 2. The relays conditioned in the manner above described are now ready to receive the second impulse. Relay 66 is still energized by reason of the first impulse. This relay being "slow to release", it will not have "dropped out" before the second impulse arrives.

The second impulse is conveyed from the line wire by way of the same impulse and relay circuits as above described, until it arrives at "break" contact 82 of relay 64. From this point the impulse is transferred to a new path including the "make" contact at 83, the "make" contact at 95, to the coil of relay 61 (#2), thence to battery and ground at 108. Relay 61 thereupon "picks up" its contacts 105, 106 and 107 which correspond respectively to the contacts 95, 96 and 97 above referred to in connection with relay 60. That is, contact 105 in closing, prepares impulsing circuit to relay 62 (#3), and contact 106 prepares a holding circuit for relay 61 in series with relay 64 through lead wire 99. Contact 107 partially prepares a circuit to the multi-contact relay 94. Relay 94 corresponds to stock designating numbers, such as 2000 to 2999.

Now, therefore, when the "make" contact at 77 is opened, relay 64 "picks up" in series with relay 61 by reason of the completion of a circuit from ground and battery at 108, the winding of relay 61, "make" contact at 106, lead wire 99, the winding of relay 64, "break" contact at 109 of relay 65, "make" contact at 102, connection wire 91', and "make" contact 91 to a ground return. Thereupon relay 64 in "picking up" completes the transfer of the impulsing circuit at the contact 82 to the circuit of relay 62 (#3) by closing the "make" contact at 82. Meanwhile, the series holding circuit of relays 63 and 60 is broken at the "break" contact at 101 and these relays return to normal. Also, contact 110, which is now closed, replaces contact 104, which now is opened, so that the prepared path to one of the multi-contact relays as at 93, 94, etc., is maintained.

The "counting chain" is now in condition for receiving the third impulse in the event that it is desired to choose a stock designating number having "3" as the "thousands" digit. However, assuming that the desired "thousands" digit is "2", as stated in the above suggested example, the relays are now ready for a comparatively prolonged cessation of the impulses. If no further impulses are sent within a predetermined time, say approximately 0.1 seconds after the end of the second impulse, then relay 66 may be so designed as to "drop out." This opens the holding circuit of relay 75 at contact 86, but relay 75 does not at this time "drop out", inasmuch as the holding circuit is still available through the "break" contact at 77 and the "make" contact 90 of relay 73. This supplemental holding circuit which may be termed a "reverse impulsing circuit" runs from ground and battery at 87, through the coil of relay 75, "make" contact at 90, "break" contact at 77, to a ground return at 78. This circuit therefore provides a prepared means of releasing relay 75 whenever the "break" contact 77 is opened for a period of more than say approximately 0.1 seconds, relay 75 being "slow to release" and constructed to open after such a period. It will be recalled that the release of relay 75 functions to apply a ground connection to the selector release bus 74.

Furthermore, relay 66 in "dropping out", transfers its contact 102 from the "make" to the "break" position. This in turn completes a circuit through the chosen one of the multi-contact relays 93, 94, etc., (in this instance relay 94), and also actuates relay 67 simultaneously as the final selector switching operation.

As above indicated, the relay 67 upon being energized, transfers its contact 79 from the "break" to the "make" position, which accomplishes the function of transferring the impulsing circuit from the selector relay chain to the indicator operating bus 68, so that subsequent impulses serve to actuate indicator apparatus hereinafter described. The circuit of relay 67 runs from grounded contact 91, connection wire 91', "break" contact at 102 of relay 66, "make" contact at 110 of relay 64, a lead wire 111 to the winding of relay 67 to battery and ground as at 112. As above stated, relay 94 is now also "picked up" and its function is to connect all of a group of connection wires as at 113 (numbered with miniature numbers as 20 to 29) to the "hundreds" selector through lead wires as at 114. The circuit of relay 94 runs from grounded contact 91, lead wire 91', through the "break" contact at 102 of relay 66, through "make" contact 110 of relay 64, lead wire 111, "make" contact 107 of relay 61, to the chosen one of the selector lead wires as at 115 running to the coil of relay 94, thence to battery and ground at 116. The closing of relay 94 completes the "thousands" selector operation, thus limiting the choice of terminals on the terminal board to those designated by numbers from 2000 to 2999.

In explaining the arrangement of the entire selecting equipment, reference may now be had to Fig. 2. It will be observed that the line wires 50 and 50' are shown terminating at polarized line relays 51 and 51'; the relay 51 being in turn connected to the "thousands" and "hundreds" selectors respectively by the lead wires 58 and 59, whereas the relay 51' is connected to the "tens" and "units" selectors respectively by lead wires 58' and 59'.

Except as hereinafter noted, the "hundreds" selector relay circuits may be substantially duplicates of the "thousands" selector relay circuits above described, and the operation of the "hundreds" selector culminates in the choosing of one of the lead wires 114. A multi-contact lead wire or cable running from the selectors to the terminal board is indicated at 117. A corresponding multi-conductor lead wire or cable from the "tens" selector is indicated at 118.

The "tens" selector connections may be the same as those of the "thousands" selector above described. The "units" selector connections may likewise be the same except that the relay corresponding to relay 66 above described is arranged to connect a lead wire corresponding to 111 directly to the battery and ground instead of merely to ground. That is, as above pointed out, the function of the "thousands" and "hundreds" selectors is to place a ground connection on the chosen vertical wire or bus of the terminal board, whereas the function of the "tens" and "units" selectors is to place a battery and return ground connection on the chosen horizontal wire or bus of the terminal board. This variation of the circuits is indicated by the supplemental diagram of Fig. 4 in which "units" selector parts corresponding to similar "thousands" selector parts are numbered to the extent necessary for clearness with like numerals accompanied by prime marks. It will be observed that the variations comprise dividing of the functions of contact 102 between a pair of contacts as at 102' and 119 and also the addition of a contact 120 to relay 73' with an accompanying battery and ground connection at 121. Contacts 120 and 119 are then connected by an independent lead wire 122. Relay 67' is connected directly to a ground 123 in lieu of being connected to a battery and ground as in the "thousands" selector. Therefore, in the "units" selector the circuit of the chosen selector lead 114' will start at the ground and battery 121 and include contact 120, lead wire 122, "break" contact 119 of relay 66' and continuing through the various relay contacts of the "counting chain" in the same manner as the corresponding circuit of the "thousands" selector continues from contact 102 as above described. It will be observed that the relay 67' may now be energized from the battery connection 121, which accounts for the substitution of the ground 123 for the battery and ground 112 above referred to.

It will be understood that the "counting chain" of relays may be operated in groups of three, such groups successively operating in conjunction with the three control relays as at 63, 64 and 65 in a manner well known in the communication arts, except for the features above explained, and accordingly such operation need not be here explained in further detail.

As above stated in connection with the "thousands" selector, one of the final operations of each group of selector relays is to effectively transfer the line impulses from the selector circuits to indicator operating busses as at 68. To avoid confusion, the busses 68 for the several selectors are designated respectively as B1, B2, B3 and B4. These busses run to selecting means for choosing as between the "open", "high", "low" and "last" indicators, which means will now be described.

*"Open", "high", "low" and "last" selection*

A group of relay circuits is illustrated in Fig. 1, Sheet 2, controlled over the busses B1, B2, B3 and B4 for applying the indicator operating impulses from such busses to "open", "high", "low" or "last" busses running to the groups of indicators. The four busses B1, B2, B3 and B4 are each provided with four branches under the control respectively of relays as at 123, 124, 125 and 126, which relays are normally open, but are arranged to be closed to connect the busses from the selectors to the "open", "high", "low" or "last" indicator bus groups or lead wires as indicated respectively at 127, 128, 129 and 130. The four busses B1, B2, B3 and B4 are also carried through the contacts of a normally closed relay 131 respectively to the magnet windings of four relays 135, 132, 134 and 133 of the "slow to release" type.

Assuming that a negative impulse is transmitted over the line 50 (see Fig. 3, for "last" bus selection), such impulse as previously explained will be effectively conveyed to bus B2 and thence to relay 132. Relay 132 thereupon "picks up" and a "make" contact is thereby grounded at 136, thus causing the closing of a circuit from the grounded contact 136 to a "break" contact 137 of a slow release relay 141, thence through the winding of a relay 142 to battery and ground at 142′. Relay 142 thereupon "picks up" and by closing a "make" contact at 146, locks itself in energized condition over the release relay contact 137, the holding circuit running from ground to contact 146, through contact 137, winding of relay 142, to battery and ground return at 142′. Relay 142 also closes contacts at 150 and 151. The closing of contact 151 causes the relay 126 to be energized, which in turn operatively connects the busses B1, B2, B3 and B4 to the "last" indicator bus wires 130. Simultaneously, relay 131 "picks up" by reason of the closing of a circuit from ground through contact 150, winding of relay 131 to battery, and a ground return at 131′. The actuation of relay 131 disconnects the relays 133, 134 and 135 from their corresponding busses B1, B3 and B4, but nevertheless relay 132 will remain connected to its bus B2 by way of a connection wire 152 and the corresponding contact on relay 126, as is obvious from the drawing. Therefore, the first negative indicator controlling impulse over the line 50 has chosen the "last" indicator bus wires 130. In a similar manner, either the "open", "high" or "low" bus wires 127, 128 or 129 could be chosen by transmitting respectively either a positive impulse over the line 50, a positive impulse over the line 50′ or a negative impulse over the line 50′. The manner in which the various above described groups of relays and contacts cooperate will be apparent from the drawing when taken in connection with the above description of the operation of the relays and contacts for choosing the "last" bus wires.

*Transmission of impulses for "restoration" of indicators.*—According to one phase of this invention, indicators such as described in the above mentioned Haselton applications may be utilized and arrangements may be provided for restoring such indicators to a normal position each time just prior to the setting up of a new quotation by such indicators.

By the use of positive and negative impulses on the lines 50 and 51, four effective impulse channels are provided which not only offer a convenient means for controlling the four selector groups, but also provide four effective channels over which the four digit indicating units for one quotation may be substantially simultaneously but independently controlled. That is, groups of positive impulses transmitted over the line 50 may be utilized to control the "hundreds" digit indicators. Groups of negative impulses transmitted over the line 50 may be utilized for the control of the "tens" digit indicators, and similarly, groups of positive and negative impulses transmitted over the line 50′ may be utilized to control the "units" and "fraction" digit indicators for the desired chosen quotation. For restoring the particular digit indicators which have been chosen and selected, to a normal position prior to reactuation, groups of ten or more impulses each may be sent over all four of these "impulse channels" as indicated in Fig. 3, such groups of impulses being transmitted, say at 0.1 seconds after the single impulse transmitted for choosing between the "open", "high", "low" and "last" bus wires. The interval of 0.1 seconds will be ample to permit the above described relays such as 126, 131, 132, 142, etc., to operate. Meantime, however, during this 0.1 seconds interval, an additional impulse as shown in Fig. 3 may be transmitted for insuring against the premature release of relays 132, 133, 134 and 135, whichever one has been actuated. Accordingly, in the example hereinabove specifically described, the relay 132 will remain energized throughout the transmission of restoration impulses over the four "impulse channels" and ten or more impulses will be carried over each of the "last" bus wires 130. But approximately 0.1 seconds after the reception of the "last" restoration impulse, relay 132 will be permitted to "drop out", thus disconnecting the ground connection at contact 136 and causing a circuit to be established from ground through contact 146 of relay 142, (its holding circuit through contact 137 of relay 141 being closed), through the "break" contact at 136 and a connection wire 153 through the winding of a relay 154, thence to battery and ground at 154'. This causes relay 154 to be energized, opening its contact at 155, which contact is in the circuit of relay 132 and consequently prevents relay 132 from being again energized during the transmission of indicator actuating impulses as hereinafter explained.

*Transmission of impulses for "actuation" of indicators.*—Impulse groups similar to the "restoration" impulse groups, but of predetermined numbers corresponding to the digit numbers of a new quotation may now be transmitted over the four "impulse channels". The energization of relay 154 in the manner above explained, in addition to opening the contact 155, also closed a contact at 156, placing an "indicator starting bus" wire 157 in parallel with a "normal actuation bus" wire 158. The "actuation" impulses now arriving over the busses B1, B2, B3 and B4 will therefore be carried over the bus wires as at 130 to the indicators which have previously been restored to a normal setting, return paths for such impulses being provided in a manner hereinafter explained by the "actuation" and "release" busses 157 and 158.

After the desired predetermined numbers of "actuation" impulse groups have been transmitted to move the four indicator units to the new positions to exhibit the desired new quotation, the "release" bus 74 will be energized in a manner hereinafter described, thus causing relay 141 to "pick up" for opening the circuits through the contacts 137, 138, 139 and 140 which will "drop out" relays such as 142 and 154, which in turn will cause relays such as 126 and also relay 131 to "drop out", thus restoring all relays to normal position ready for the next operation.

*Selecting "last" indicators concurrently with either "high" or "low" indicators.*—It will be observed that the "high" and "low" relays 134 and 133 are associated through busses B3 and B4 with line wire 50', while the "last" relay 132 is associated through bus B2 with line 50. Therefore, relay 134 or relay 133 respectively, may be operated simultaneously with relay 132 by sending either negative or positive preliminary impulses over line 50' concurrently with the negative impulse transmitted over line 50. That is, while the "last" relay circuits are controlled over one of the line wires, either the "high" or the "low" relay circuits as desired may be simultaneously controlled over the other line wire, thus permitting the digit indicators for either the "high" or the "low" quotation to be operated conjointly with the "last" in instances where the price change is such as to require a resetting of the "high" or "low" indicators. In other words, referring to Fig. 3, if it were desired to operate the "high" indicators concurrently with the "last" indicators, then a positive impulse would be transmitted over the line 50' and concurrently with the individual negative impulse as above explained, and on the other hand, if it were desired to operate the "low" indicators concurrently with the last, then a single negative impulse would be similarly transmitted over the line 50'.

*Terminal board arrangement*

If desired, substantially the same terminal board arrangement may be used as disclosed in the above mentioned Haselton application Ser. No. 244,873. In Fig. 1, Sheet 2, the terminal board is indicated generally at 159 and may include a plurality of vertical wires or busses as at 160 and a plurality of horizontal wires or busses as at 161. At each intersection of the wires 160 and 161 a plug jack or terminal such as at 162 may be provided to cooperate with interchangeable plugs as at 163, according to the invention covered by the above mentioned Daine patent. The plugs 163 may be connected through selector circuit lead wires as at 164 respectively to multicontact relays as at 165, one of which may be provided for each of the various groups of indicators corresponding respectively to the various stocks or other items. It will be understood that the relays 165 serve to connect the digit indicating units for the chosen stock or item to the operating bus wires as at 127, 128, 129, 130, 157 and 158 in a manner similar to the operation of the corresponding multicontact relays disclosed in the Haselton application 244,873. Also if desired, the relays 165 may be utilized to connect indicating lamps as at 166 in circuit with a battery and ground at 167 through a lamp bus at 168. The lamp circuits may be continued respectively through the corresponding multicontact relay 165, through the connection wire as at 169 and thence to a ground return at 170, if desired, by way of a suitable audible signal device as at 171. The device 171 may for example take the form of a single stroke bell to give a signal whenever any stock quotation is being changed, such signal being accompanied by the lighting of a lamp 166 at the particular group of indicators which is being operated.

The circuits through the windings of the multi-contact relays are as follows: Starting at the battery and ground at 121 in Fig. 4, a typical selector circuit continues through connection wire 122 to the chosen one of the "units" selector wires 114', (see Fig. 2), thence through the particular multicontact relay chosen by the "tens" selector to one of the wires of cable 118, thence through the corresponding jack and plug of the terminal board and one of the wires at 164, through the coil of the corresponding relay 165 (providing indicators are connected for the particular stock chosen), back through one of the wires 164. through the corresponding plug and jack to that one of the vertical terminal board wires 160 which has been chosen and grounded by the "thousands" and "hundreds" selectors in the manner above described. Of course, if at a particular receiving station the proprietor does not desire to post certain items, he need not insert one of the interchangeable indicator plug connections in the jacks corresponding to such undesired item or items, and in that event only the selecting operations will be performed at the receiving station.

The 16 indicator units provided for each stock or item may be operated by electromagnets as at 172. In that event, one terminal of each of the magnet windings 172 may be connected to the operating busses through the multicontact relay 165 as shown. The other terminals of the magnet windings may be connected to the mid point of a double throw switch as at 173, the movements of such switch being mechanically controlled (in a manner similar to that shown in the above mentioned patent to Frischknecht et al.) by the indicator movements. The switches 173 are arranged to normally make contact with the right hand switch contacts as shown in Fig. 1, thereby connecting the electromagnets 172 normally with the "actuating" bus 158 by way of the multicontact relays 165, but when the indicator is in a normal position, such for example as to indicate a "blank", the switches 173 are then moved to the left and in making contact with the left hand contacts, the electromagnets 172 are operatively connected to the "indicator starting bus" 157 by way of the multicontact relays 165. The indicators may be constructed to have 11 exhibiting positions corresponding respectively to the characters 0, 1 to 9, and a "blank" arranged in the order named. Thus, when "actuating" bus 158 is connected to the battery at 154', and a series of ten or more "restoration" impulses are transmitted in the manner above described, the chosen indicators will be actuated step-by-step from whatever positions they previously occupied until they arrive at their "blank" or normal positions respectively, whereupon the bus 158 will be disconnected by reason of the operation of switches 173. However, when the transmission of "actuation" impulses is initiated, the relays such as at 154, etc., will have operated their contacts 156 so as to connect the busses 157 and 158 in parallel, thus permitting "actuation" impulse circuits to be completed through the electro-magnets 172, first by way of the left hand contacts of switches 173 and then by way of the right hand contacts through busses 157 and 158 respectively, to the battery and ground at 154'. The indicators which have been chosen and "restored" may thus be advanced from the normal or "blank" positions to new positions, depending upon the number of impulses transmitted.

In disconnecting the indicators after their operation, there will ordinarily be at least one impulse received at such indicators, which impulse is necessary to disconnect the selecting circuits as hereinafter explained. Therefore, if no "actuation" impulses are transmitted after "restoration" of the indicators, the indicators nevertheless will be moved from normal or "blank" positions to exhibit zeros upon disconnection of the selectors as a result of the disconnection impulses. On the other hand, if one "actuation" impulse is transmitted, the indicator will thereby be moved to zero and upon arrival of the disconnection impulse, the indicator will be moved to Exhibit 1, which is the indication desired. In order to leave the indicators at normal or "blank" at night or other times, for example, when the markets are closed, the indicators may be operated as if to exhibit 9 in each case and then upon disconnection of the selectors, they will be moved to exhibit "blanks". It will be observed that the positions of the zero and "blank" indications on the indicators as above described are interchanged as compared with the indicators disclosed in the Haselton application Ser. No. 244,873 and as in the above mentioned patent to Frischknecht et al., but in other respects like or similar indicators might be used.

*Release of selector relays*

The release of the selector relays will now be explained in connection with Fig. 1, Sheet 1. This operation of course takes place after the indicators for the chosen stock or item have been moved to exhibit a new quotation. It will be noted that after relay 66 "drops out" upon completion of the selection of the desired stock or item, the opening of the contact 86 disconnects the ground at 85 from relay 75. It will be recalled, however, that relay 75 is maintained energized by reason of a circuit through contact 90, a "break" contact at 77, and a ground return at 78. That is, as long as contact 77 is not opened for as long as 0.1 seconds, relay 75 remains "picked up". However, if now a comparatively sustained positive potential for example is applied to the line 50, the relay 69 will withdraw contact 77 a sufficient length of time to permit the relay 75 to "drop out". Thereupon contact 88 will be released for placing a ground connection on the "release" bus 74. This ground connection from contact 88 is provided through the grounded contact 89 which is now closed, inasmuch as relay 73 is still energized. A circuit is thus provided through release bus 74, coil of relay 71, to battery and ground 73', as well as through the corresponding relays at the "hundreds", "tens", and "units" selectors, and such relays "pick up". Likewise, the grounded "release" bus 74 completes a similar grounded battery circuit through the relay 141 (see Fig. 1, Sheet 2), which "picks up" and releases the "open", "high", "low" and "last" selector circuits in the manner above described.

The relays such as 71 upon being energized, break the contacts such as at 72, thereby releasing relays such as at 73, which nevertheless "hold up" for approximately 0.1 seconds. Meanwhile, the relay 71 by closing its contact at 76, places an additional ground on the release bus 74, the circuit being from ground at 78, "make" contact at 77, "make" contact at 76, to bus 74. Also, the circuit or circuits to the indicator operating busses, as at B1, are completed as follows: ground 78, "make" contact at 77, "make" contact at 79, to bus 68, thus providing the release impulse for stepping the indicators into their final positions.

In the "hundreds" selector relay group there is a slight variation in this last indicator impulse operation (assuming that the sustained selector releasing impulse is positive and from line 50) in that the circuit from the bus B2 runs through the "make" contact as at 79″, "make" contact as at 76″, to the grounded "release" bus 74. The operation of the "tens" and "units" selector releasing circuits may be the same as of the "hundreds" selectors circuits.

During the releasing operation the relay 71 also opens its contact at 80, preventing the release impulses from going to the selectors after their release.

Approximately 0.1 seconds after the relay 71 is released, the relay 73 "drops out", thus opening contact 91, which releases all of the selector relays such as 60, 61, etc., 63, 64, 65, 92, 93, 94, etc. as well as the multicontact relay 165 at the indicators. The relay 73 also opens its contact 89 removing its "holding" ground connection. Furthermore, the contact 90 is opened, which opens the circuit of relay 75. Relay 67 "drops out" when contact 91 opens. At the termination of the prolonged release impulses over the line wire, the relay 69 will "drop out", thus leaving all relays in normal position when the potential on the line is removed.

It will be observed that a single sustained potential over one line wire may be utilized for the releasing operations in connection with all four selector groups. Therefore either of the lines might of course be utilized for this purpose and the potential might be of either polarity. (In Fig. 3 a positive potential is indicated on line 50').

*Alternative indicator arrangement*

Our invention, according to one of its embodiments, may comprise a different type of indicating unit, which will be hereinafter described, in which the four digit indicating dials or drums may be geared together and actuated in unison by a single magnet or set of magnets. With this form of indicator, instead of restoring the dials to zero or to a normal position prior to the setting up of a new quotation, the indicator may be turned "up" or "down" an amount corresponding to the price or quotation change, that is, an amount equalling the difference between the old and new quotations. As hereinafter explained, one electro-magnet may be used to move the dials forward for a price advance and another electro-magnet may be used to turn the dials backward in the event that a lower price is to be quoted. A unitary indicator assembly is therefore provided for each of the four quotations, such as "open", "high", "low" and "last", for each item. One type of circuit arrangement which may be utilized to control such indicators is shown in Fig. 5. The operation of the circuits of Fig. 5 is very similar in many respects to that of the circuits above described and hence corresponding parts where possible are numbered with the same reference numerals accompanied by prime marks.

The circuits of Fig. 5 may cooperate with indicator operating busses B1, B2, B3, B4, and selector circuits 164, as in the embodiment above described. Let us assume that it is desired to choose the "last" indicator for a particular stock or item. In that event a preliminary impulse arriving over bus B2 will energize relay 132', causing contact at 136' to be grounded. Thereupon relay 142' closes and retains itself closed by reason of the closing of a circuit through contacts 146' and 137' in the same manner as in the above described embodiment. When relay 142' actuates, it closes contacts at 150' and 151'. Contact 150' closes a circuit through relay 131', which causes all of the four busses B1, B2, B3 and B4 to be opened at that relay. Contact 151' at the same time closes a circuit through relay 126' for connecting the "last" indicator bus wires 130' in circuit. All these relays (except 132') remain thus energized until released by relay 141' acting in cooperation with release bus 74 substantially in the manner above described in connection with the first embodiment of the invention. The only necessary variation in the selector circuits comprises the omission of the contacts such as at 76 on relay 71, together with the connection wires thereof, except in the "thousands" selector.

The indicators may be actuated in one direction, say for higher values, by negative impulses arriving over line wire 50 and bus B2. Likewise, positive impulses arriving over line wire 50' and bus B3 may be utilized to turn the indicators in a direction to exhibit lower numbers, such as for lower prices. Accordingly, positive impulses sent over the line 50 and bus B1 (subsequent to the selecting operations) may then be used exclusively for purposes of releasing the selectors and these positive impulses will not affect the indicators, since bus B1 is ended at relay 131' as shown. That is, all four "impulse channels" provided by the two line wires may be used for selection purposes, but only two need be used with this type of indicator for purposes of actuation of the indicators. One of the remaining channels is utilized for the release of the selectors and by the omission of the the contact 76 as above referred to, the release impulse is not cross-connected to either of busses B2 or B3 as used for actuation. That is, the indicator dials of this embodiment are not ordinarily returned to a normal setting prior to resetting and accordingly such indicators may not readily be made to absorb the extra selector releasing impulse as occurring in the embodiment first described. Therefore, the selector releasing impulse in this embodiment may be preferably transmitted over one of the two "impulse channels" not utilized for "actuation" impulses, namely by positive impulses on line 50, for example. According to the first described embodiment using the contacts as at 76 at the various selectors, such release impulses would nevertheless be translated to all four busses B1, B2, B3 and B4 by reason of the return circuit paths over release bus 74. But by omitting contacts 76, as above specified, such paths are eliminated and the release impulse is confined to the selector circuits, as desired.

In the embodiment of Fig. 5 only a single indicator circuit return bus 158' need be provided, inasmuch as the "restoration" and subsequent indicator starting problem does not arise to make necessary an "indicator starting bus". The bus 158' runs to battery and ground as at 154', the return ground being at the beginning of either bus B2 or bus B3 at the selectors (see Fig. 1, Sheet 1), as will be readily understood from the description of the first embodiment of the invention.

The above described systems may operate in conjunction with various types of impulse transmitting devices known in the art. For example, the mechanism of a tape transmitter which could be readily applied for this purpose is disclosed in Haselton application 244,873 and a keyboard transmitter readily adaptable to this system is disclosed in Haselton application 248,069. As above stated, Fig. 3 serves to illustrate the character of the impulse sequences necessary for the control of the receiving circuits. Fig. 3 will now be explained in further detail: To perform the selecting operations, say for selecting an item or stock designated by the number 5234, selector impulse groups will be transmitted over the line wires 50 and 50' as follows: On line 50, five regularly spaced positive impulses and two negative impulses interspaced with the positive impulses as shown. On line 50', three regularly spaced positive impulses and four negative impulses interspaced with the positive impulses so far as possible. Accordingly, the time necessary for selecting purposes is determined by the impulse groups for the larger digit, namely 5. Thereafter, a suitable interval, say 0.2 seconds, may be allowed for insuring completion of the operation of the selector relays. Next, in order to select as between the "open", "high", "low" or "last" quotations, a single positive or negative impulse is sent over one of the lines. In the example shown in Fig. 3, the negative impulse on line 50 serves to choose the "last" indicators. After this single impulse, a suitable interval as above explained may be allowed for completion of the operation of the relays, but meanwhile in order to retain the selector control relays in "picked up" condition, a "sustaining" impulse may be transmitted, for example a negative impulse on line 50. Thereafter interspaced groups of positive and negative impulses totaling ten in each case, may be sent over each wire for "restoration" purposes. After "restoration" of the desired indicators, an interval of say 0.2 seconds may be allowed for preparing the energization circuits for the "indicator starting bus" in the manner above described. Thereupon the indicator actuation impulses are transmitted. If four separate digit indicating units are provided for each quotation, in quoting the number, say 1283/8, then one positive impulse would be sent over line 50 followed by two spaced negative impulses. On line 50', eight positive impulses would be transmitted interspaced with three negative impulses, the latter serving to move the "fractions" indicator to its third position to indicate 3/8. Of course if decimal fractions were used and it were desired to exhibit the fraction 0.4, then four negative impulses would be transmitted over the line 50'.

In the event that the four digit dials or drums for one quotation are geared together, and it is for example, desired to exhibit a price increase of 1/4, then two negative impulses might be transmitted over line 50 for moving the indicator "up" two steps (equivalent to 2/8 or 1/4), these impulses taking effect over bus wire B2. On the other hand, if a price decrease to be exhibited was 1/4, then line 50' would in a similar manner be energized with two positive impulses, which would take effect over bus connection B3. After the indicator actuation is completed, in the event the four independent indicators are used, a prolonged selector releasing impulse may then be transmitted over either line 50', but as above indicated, in the event that the indicators having the four digit dials geared together are used, then for example, a prolonged selector releasing positive impulse might be transmitted over line 50, and effective over bus B1 without interference.

*Alphabetical item designation*

If, instead of using the numerical system for designating the numerous stocks or other items, it is desired to identify stocks by a system using for example the same letters as are now well known to brokers' customers, the selectors may be readily operated by prefixing such letters by a number of zeros sufficient to give a total of four designating characters. That is to say, for example, in the case of U. S. Steel stock, known by the abbreviation "X", for purposes of operation of this system this stock could be known as #000X. Similarly, U. S. Rubber would be known as #00RU. Or else, if desired, for greater simplicity in some instances, a three character designating system may be used making necessary the use of but three selectors. In that event the stocks would be known as #00X and #0RU. Such a system would provide for a total of $26^3$, or 17576 items, a number much higher than necessary to provide for all future purposes now apparent. In fact, a pair of selectors providing for 676 items ($26^2$) would be ample for use in quoting the present stocks of the New York Stock Exchange if designating abbreviations were limited to two characters. Of course with full alphabetical designation systems, a total of 27 steps would be provided for in the operation of the selectors, as above suggested, including one step for each letter of the alphabet in addition to one step corresponding to zero.

With alphabetical designation systems if desired, in order to reduce the number of selecting steps per selector, the alphabet may be divided into parts, one part allocated to each of a plurality of selectors. For example, the above described "thousands" selector in that event would correspond to the first half of the alphabet, while the "hundreds" selector would correspond to the last half of the alphabet for, say the first designating character of an abbreviation. For another designating character of the same abbreviation, the alphabet could be likewise divided between selector groups such as the "tens", and "units" groups above described. Of course a large number of selector groups would be operated in conjunction with a larger number of line wires to obtain a greater speed. Furthermore, the above described system may be duplicated and the duplicate systems controlled at the central station by two separate operators.

Certain features of the above described systems may be conveniently summarized at this point. Using the numerical designating system and two line wires, it is apparent that provision is made with the above equipment for the transmission of quotations for as many as 10,000 different stocks or items. Furthermore, a normally "open circuit system" is provided. That is, when no quotations are being chosen or transmitted, the line wires are normally at zero potential, notwithstanding the fact that the selectors are automatically restored to normal at the end of each quotation transmitting operation. The selectors may be quickly restored to normal, merely by the use of a sustained impulse, although such sustained impulse is not of sufficient duration to materially reduce the speed of operation. Furthermore, all moving parts, including not only the selector parts but the indicator units, may be restored to a normal position each time that a quotation is transmitted, and accordingly cumulative errors resulting from accidental transmission of an incorrect number of selector or actuation impulses are precluded, and if any part is inadvertently or accidentally incorrectly operated, its position may be readily corrected. The choice of "open", "high", "low" or "last" quotation indicators is expeditiously determined by a single preliminary impulse sent just after the selection is completed.

The above described systems operate entirely by the use of relays, thus insuring quiet and rapid operation notwithstanding the use of standardized parts which may be very compactly arranged. However, it will be understood that certain phases of the invention are applicable to selectors other than of the "all-relay" type, for example, the Strowger type, as explained in the Haselton application 244,873. Furthermore, the systems are applicable to various types of digit indicators as above explained.

*Geared dial indicators*

Referring now to Figs. 6–9 inclusive, the geared dial type of indicator above referred to will be described in detail. The use of this type of indicator is particularly desirable in some instances, since but two electromagnets are required operated over three wires for each group of four digit wheels for indicating one quotation. The use of a correspondingly small number of ratchet mechanisms for driving the digit indicating drums is accordingly also made possible. Furthermore, when such indicators are made reversible, it is unnecessary to transmit the entire new quotation each time that a price change takes place. That is, only the digits need be changed which are different from the corresponding digits in the previous quotation. The necessity for restoring the indicators to zero is accordingly also obviated, which in some instances may be advantageous.

As shown in Fig. 6, the indicator group may consist of the four digit drums or dials as at 11, 12, 13 and 14 carried upon hubs as at 15, which in turn are rotatably mounted upon a shaft 16. These four dials correspond respectively to the "fractions", "units", "tens", and "hundreds" digits of the quotation to be posted.

The dials consist preferably of light sheet material, such as aluminum, in order that the inertia may be substantially minimized. The "fractions" dial 11 may be fixed directly to the shaft 16 to rotate therewith, while the other dials are free to rotate in respect to the shaft. Dials 12, 13 and 14 may, however, be operatively geared to the "fractions" dial 11 by "carrier" pinions as at 17, 18 and 19 cooperating with teeth as at 20 formed in the edges of the dials 12, 13 and 14 respectively. These pinions may be rotatably mounted on a shaft 21, and together with the teeth on the dials constitute the well known intermittent register gear train commonly known as the Geneva movement.

Shaft 21 may be rotatably mounted within an end plate 22 and a strut 23; shaft 16 may be also mounted in the end plate 22 at one end, and in a division plate 24 at its other end. It will be understood that a fractional part of the circumference of the dials sufficient to exhibit one character is made visible through apertures as at 25 in a face plate 26 provided as a part of the indicator container (see Fig. 7).

In order to provide means for rotating the shaft 16, together with dial 11, in either direction and for restraining the movement thereof when the desired step-by-step rotational movement has been completed, two oppositely directed ratchets as at 27 and 28 may be provided upon the outer end of the shaft 16 (see Fig. 8). The ratchet 27 is arranged to cooperate with a spring pressed pawl 30 having a spring 31, to turn the digit wheels in a direction to exhibit higher numbers. The pawl 30 may be mounted upon a thrust bar as at 32 so arranged that upon the forward stroke of the bar 32, the pawl 30 moves away from an adjustable stop pin as at 33 and is brought into engagement with one of the teeth as at 34 on the ratchet 27. Continued forward movement of the bar 32 thereupon causes the ratchet to be rotated together with the shaft 16 against the pressure of a jockey roller 35 (see Fig. 9) which may be pressed against a cam as at 29 by its supporting spring 36. When the shaft 16 is rotated through an angle equivalent to one step (1/10 of a complete revolution to exhibit the next character), the forward movement of the pawl 30 is arrested by a front stop pin 37, causing the pawl to bind in the ratchet 27.

A similar pawl and controlling mechanism is arranged to cooperate with the ratchet 28 to move the shaft 16 step-by-step in the opposite direction. Similar parts of the two ratchet and pawl mechanisms are identified with the same reference numerals accompanied by prime marks in the case of the mechanism cooperating with ratchet 28. The pawl 30' is illustrated in the position which it assumes at the completion of its forward movement.

The thrust bar 32 may be pivoted to an armature 38 as by a pivoting pin 39, the armature in turn being pivoted to the top frame 40, as at 41. The armature is normally urged away from a pole 42 of a magnet 43 by a spring 44. The armature thus retained, acts through the thrust bar to keep the bar normally in engagement with a stop pin 45. The thrust bar 32' is similarly controlled.

Accordingly the pawls 30 and 30' are normally held out of contact with their respective ratchets.

It will be evident that each time the magnets 43 or 43' are energized, the shaft 16 will be advanced or turned back through an angle equivalent to one step and it will be observed that the mechanism for advancing the shaft is operative independently of the mechanism for effecting the reverse movement and accordingly, the two movements will not interfere.

Suitable terminals as at 46, 47 and 48 may be provided for the electro-magnet lead wires 49—the terminal 48 being connected as a common return for both pairs of electro-magnets, while the other two terminals provide the necessary two operating circuits. These terminals are preferably of a quick detachable type to facilitate removal of the indicator units for inspection, repair or replacement purposes, etc.

Certain apparatus and features herein disclosed and not claimed specifically are disclosed and claimed in our copending divisional application Ser. No. 425,992, filed February 5, 1930.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patents of the United States is:

1. In an electrical indicating apparatus, the combination of a plurality of groups of indicator units, a plurality of electro-magnetically operated indicator elements in each group, a series of bus lines for corresponding indicators in the various groups, a line wire over which positive and negative impulses are transmitted to the apparatus, and means responsive to positive and negative impulses over said line wire for selectively connecting groups of indicators to said busses and for connecting one of said busses responsively to said line wire.

2. In an electrical indicating apparatus, the combination of a plurality of groups of indicator assemblies each indicator assembly comprising a plurality of electro-magnetically operated elements, bus lines each common to corresponding elements of corresponding indicator assemblies in said groups, main actuating lines common to said bus lines, a line wire extending to a remote point, and means controlled by positive and negative impulses on said line wire for selectively connecting the indicator elements of all of the assemblies of a group to all of the bus lines, for selectively connecting the bus lines to the actuating lines and for responsively connecting the actuating lines to said line wire.

3. The combination of a plurality of groups of indicators each group of indicators comprising a plurality of electromagnetically actuated indicator elements, of transmission lines equal in number to one-half of the number of indicator elements in each group of indicators, pairs of cooperating selectors each pair comprising one selector element responsive to positive impulses on one line and another selector element responsive to negative impulses over said line, said pairs cooperating to selectively prepare electrical paths to said groups of indicators, and means responsive to impulses over portions of said paths for completing the path to one of the indicators in said selected group.

4. The combination of a plurality of groups of electromagnetically actuated indicators, transmission channels, selectors responsive to positive and negative impulses over said channels for selecting a group of indicators, and a plurality of means equal in number to the number of indicators of a group and each responsive to a characteristic impulse on a predetermined one of said channels, for selecting an indicator within the selected group of indicators.

5. In an electrical indicating apparatus comprising a plurality of groups of indicators, each group comprising four indicator assemblies and each assembly comprising four indicator elements, two electrical impulse transmission paths, means responsive to positive and negative impulses over said paths for selecting any one of a plurality of groups of indicators that may be designated by a number of four digits, and means responsive to a single positive or negative impulse over said paths for selecting one of the four assemblies of a selected group of indicators.

6. In an electrical indicating apparatus comprising a plurality of groups of indicators, a plurality of electrical transmitting paths, a plurality of actuating lines, a plurality of indicator busses, means responsive to a variable plurality of positive and negative impulses on said paths for connecting a group of indicators to all of said busses and for causing positive and negative impulses over each of said paths to selectively cause impulses over two of said actuating lines, means controlled by a single impulse over any one of said actuating lines for effecting a connection between said actuating lines and a predetermined one of said bus lines.

7. The combination of a plurality of groups of registers, a plurality of bus lines adapted to be extended to said registers, a plurality of actuating lines equal in number to the number of elements in a register, and means responsive to single impulses over two of said actuating lines for connecting any predetermined two of said bus lines to said actuating lines.

8. The combination of two impulse electrical transmission paths, four register actuating lines, two pairs of register bus lines, and means responsive to a single negative or positive impulse on either or both of said paths for respectively connecting either one of either or both pairs of bus lines to said actuating lines.

9. In an electrical indicating apparatus comprising a plurality of groups of indicators, two pairs of selectors, multiple contact relays in each pair of selectors selectively energizable under control of one of the selectors of said pair of selectors, a plurality of selector lines selectively grounded under control of the other selector of one pair, another plurality of selector lines adapted to be activated by connection to battery and ground by the other selector of the other pair, and a multiplicity of indicator group selector circuits adapted to be selectively connected by said energized multiple contact relays to said selectively grounded and activated lines.

10. In a normally de-energized electrical indicating apparatus comprising a plurality of groups of indicators, electrical transmission channels, means responsive to current variations over said channels for selecting groups of indicators, means responsive to a single subsequent impulse over one or more channels for selecting one or more indicators in a group, means responsive to subsequent impulses over said channels for restoring the selected indicator or indicators to home position, means responsive to subsequent impulses over said channels for actuating the selected indicator or indicators, and means responsive to a prolonged potential on one of said channels for de-energizing the apparatus and restoring the indicator selecting parts to normal condition.

11. In an apparatus of the character described, the combination of a plurality of groups of electromagnetically operated indicators for posting information as to stocks or other items, each group of indicators including a plurality of assemblies of indicators for indicating information such as the price range of stocks, group selecting means comprising a pair of counting chain relay selectors for closing one arm of the circuit for effecting selection of any group of indicators, means responsive to alternate, positive and negative impulses for respectively and concurrently operating the counting chain relay selectors, each of said means including an impulsing relay for sending impulses to the relays of said counting chain, means included in each of said selectors and operable upon cessation of said impulsing means for cutting off impulses from said counting chain relays, selection means for selecting any assembly of indicators within a selected group of indicators, and means also controlled by said last mentioned means for causing subsequent impulses produced by said impulsing means to selectively control the operation of said assembly selection means.

12. In an apparatus of the character described, the combination of a plurality of groups of electromagnetically operated indicators for indicating information as to stocks or other items, each group including a plurality of indicator assemblies, means responsive to electrical variations received from a distant point for selecting any group of indicators by preparing actuation paths therefor, means responsive to subsequently effective electrical variations received for extending the actuation paths of any particular assembly, means responsive to another series of impulses received for transmitting impulses over said extended actuation paths to restore the selected assembly of indicators to home position, said series of impulses being of a number to turn each indicator to home position regardless of its position, means for rendering surplus impulses ineffective as the indicators reach their home position, and means for causing other subsequently effective impulses received to again operate said indicators for the purpose of effecting a new set-up.

13. In an apparatus of the character described comprising a plurality of groups of electromagnetically operated indicators for indicating information as to stocks or other items, each group of indicators including a plurality of assemblies of individually electromagnetically operated indicator units corresponding to the digits of a quotation, a selecting mechanism including two pairs of selectors each responsive to alternate positive and negative impulses over a line wire and operable to prepare actuation paths to all the indicated units of any group of indicators, and means responsive to subsequent impulses received over said line wires for connecting the actuation paths of any particular assembly of indicators responsively to said line wires to cause subsequent impulses received over said line wires to selectively transmit impulses over said actuation paths for operating any of the indicator units in a selected assembly.

14. In an electrical indicating apparatus comprising a plurality of groups of indicators, two pairs of selectors responsive to electrical impulses received over electrical connections from a distant station, multiple contact relays in each pair of selectors selectively energizable under control of one of the selectors of said pairs of selectors, a plurality of selector lines selectively activated under control of the other selector of one pair, another plurality of selector lines adapted to be activated by the other selector of the other pair, a multiplicity of indicator group selector circuits adapted to be selectively connected by said energized multiple contact relays to said selectively activated lines and a plurality of multicontact relays equal in number to the plurality of groups of indicators selectively energizable by said selector circuits for placing the indicators of any desired group responsively under the control of impulses subsequently received over said electrical connections.

15. In an electrical indicating apparatus, the combination of a plurality of groups of indicator assemblies, electromagnetic operating means for each indicator, a circuit connection to one side of each of the electromagnetic means, a pair of circuit connections on the other side of each of the electromagnetic means, one of said circuit connections being closed in the home position of the indicator and open in every other position of the indicator and the other of said circuits being open in the home position of the indicator and closed in every other position of the indicator, a plurality of selector devices operable under control of electrical variations received for causing said second mentioned circuits of the pair of circuit connections of the electromagnetic means of the indicators of any assembly to be activated under control of subsequent electrical variations received, and means operable by further electrical variations received for causing said first of the corresponding pairs of circuit connections to be activated under control of subsequent electrical variations received.

16. In an electrical indicating apparatus, the combination of a plurality of groups of assemblies of electromagnetically operated indicator units, circuit connections for operating said units forwardly to home position and other circuit connections for operating said units from home position, selector means responsive to electrical variations received for rendering said first mentioned circuits to any assembly of any group responsive to subsequently received electrical variations, and means automatically operable after cessation of said second mentioned electrical variations for causing subsequent electrical variations received to operate the indicator units of the selected assembly over said second mentioned circuit connections.

17. In an apparatus of the character described, the combination of a plurality of groups of assemblies of electromagnetically operated indicator units, selector means responsive to impulses received for placing any assembly of indicators of any group under control of electrical variations subsequently received, said selector means including relays, means for maintaining operated relays energized, and means responsive to a distinctive electrical variation received for releasing said selector means.

18. In an electrical indicating apparatus, the combination of a plurality of groups of indicator assemblies, each assembly including a plurality of electromagnetically operated indicator units, means responsive to electrical variations received for preparing circuit paths for operating any of said groups of indicators, means responsive to electrical variations subsequently received for extending the paths of any assembly of a selected group to cause impulses produced under control of further electrical variations received to operate the indicators of the selected assembly, means for holding said last mentioned means operated, and means responsive to distinctive electrical variations received for disabling said holding means and for restoring said first and second mentioned means to normal.

19. In an apparatus of the character described, the combination of a plurality of groups of electromagnetically operated indicators, and means responsive to impulses received for establishing electrical connections for selectively operating the indicators of any group under control of impulses subsequently received, said last mentioned means including a pair of counting relay chains, means whereby the individual chains are operable concurrently but independently in response to impulses of different character received over a single wire and means whereby the two relay chains cooperate to establish said connections.

20. In an apparatus of the character described, the combination of a plurality of groups of indicators, each group including a plurality of assemblies of indicator units, means for selecting a group of indicators for operation, means for selecting an assembly within said group for operation, two circuit connections for each of the indicator units, impulses over one of said circuit connections operating said units into home position and impulses over the other of said circuit connections operating said indicators out of home position, and means automatically operable upon termination of the selection of a group of indicators for causing subsequently received electrical variations to operate the means selecting said assemblies of indicators, means operated as said group and assembly selection is effected for conditioning said first mentioned connections to receive and transmit impulses to the selected assembly, and means automatically operable upon conclusion of impulses over said first mentioned connections for conditioning said second mentioned connections to receive and transmit impulses to the selected assembly.

In testimony whereof we have signed our names to this specification.

MERTON L. HASELTON.
PAGE S. HASELTON.